US012759062B2

(12) United States Patent
Kakai et al.

(10) Patent No.: US 12,759,062 B2
(45) Date of Patent: Oct. 13, 2026

(54) CUTTING INSERT AND HIGH FEED MILLING TOOL

(71) Applicant: AB SANDVIK COROMANT, Sandviken (SE)

(72) Inventors: Isak Kakai, Sandviken (SE); Lars Gangstad, Sandviken (SE); Sophie Cavallin, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 737 days.

(21) Appl. No.: 18/024,068

(22) PCT Filed: Aug. 25, 2021

(86) PCT No.: PCT/EP2021/073502
§ 371 (c)(1),
(2) Date: Mar. 1, 2023

(87) PCT Pub. No.: WO2022/048966
PCT Pub. Date: Mar. 10, 2022

(65) Prior Publication Data

US 2023/0278115 A1 Sep. 7, 2023

(30) Foreign Application Priority Data

Sep. 2, 2020 (EP) .................................... 20194028

(51) Int. Cl.
*B23C 5/20* (2006.01)
*B23C 5/10* (2006.01)

(52) U.S. Cl.
CPC .............. *B23C 5/202* (2013.01); *B23C 5/109* (2013.01); *B23C 2200/123* (2013.01)

(58) Field of Classification Search
CPC B23C 5/202; B23C 5/109; B23C 5/20; B23C 5/2213; B23C 5/2247;
(Continued)

(56) References Cited

U.S. PATENT DOCUMENTS 6,196,770 B1 * 3/2001 Astrom .................. B23C 5/109 407/43
10,239,134 B2 * 3/2019 Saji ......................... B23C 5/109
(Continued)

FOREIGN PATENT DOCUMENTS

EP 2638992 A1 9/2013
EP 3199284 A1 8/2017
(Continued)

*Primary Examiner* — Ryan Rufo
(74) *Attorney, Agent, or Firm* — Corinne R. Gorski

(57) ABSTRACT

A cutting insert for use in high-feed milling has a 180° rotational symmetry about a center axis and includes first and second major faces, a median plane extending between said major faces perpendicularly to the centre axis, a first main cutting edge and an associated first ramping cutting edge, and a second main cutting edge and an associated second ramping cutting edge. Each main cutting edge has a first end facing the associated ramping cutting edge and an opposite second end. Each ramping cutting edge has a first end facing the associated main cutting edge and an opposite second end. The cutting edges slope such that their second ends are located closer to the median plane than the respective first ends, and the second ends of the main cutting edges, are located closer to the median plane than the second ends of the ramping cutting edges.

20 Claims, 10 Drawing Sheets

(58) Field of Classification Search
CPC ................ B23C 5/2273; B23C 5/2304; B23C 2200/203; B23C 2200/0461; B23C 2200/0494; Y10T 407/23
See application file for complete search history.

(56) References Cited

U.S. PATENT DOCUMENTS

| | | | |
|---|---|---|---|
| 10,245,659 | B2 | 4/2019 | Kyocera |
| 2004/0009088 | A1 | 1/2004 | Glatzle et al. |
| 2017/0157685 | A1* | 6/2017 | Mao .......................... B23C 5/10 |
| 2017/0291231 | A1* | 10/2017 | Mao ........................ B23C 5/202 |
| 2019/0030629 | A1* | 1/2019 | Vlcek ..................... B23C 5/202 |
| 2019/0358707 | A1 | 11/2019 | Garcia et al. |

FOREIGN PATENT DOCUMENTS

| | | | |
|---|---|---|---|
| EP | 3653743 | A1 | 5/2020 |
| JP | H1150182 | A | 2/1999 |
| JP | 2004195563 | A | 7/2004 |
| JP | 2007021658 | A | 2/2007 |
| JP | 2009172697 | A | 8/2009 |
| JP | 2015193049 | A | 11/2015 |
| JP | 2018503525 | A | 2/2018 |
| WO | 2012035511 | A1 | 3/2012 |
| WO | 2019022086 | A1 | 1/2019 |

* cited by examiner

CUTTING INSERT AND HIGH FEED MILLING TOOL

RELATED APPLICATION DATA

This application is a § 371 National Stage Application of PCT International Application No. PCT/EP2021/073502 filed Aug. 25, 2021 with priority to EP 20194028.5, filed Sep. 2, 2020.

FIELD OF THE INVENTION AND PRIOR ART

The present invention relates to a cutting insert for high-feed milling. The invention also relates to a high feed milling tool comprising such a cutting insert.

A milling tool is a rotating cutting tool, which may be provided with one or more cutting inserts. A milling tool may have the form of an end mill tool, which may be used in high-feed milling, for instance in order to perform ramping operations, including pocketing operations.

Indexable cutting inserts for high-feed milling are previously known in various configurations and examples of such cutting inserts are for instance disclosed in U.S. Pat. No. 10,245,659 B2 and EP 3 199 284 A1.

OBJECT OF THE INVENTION

The object of the present invention is to provide a cutting insert of the above-mentioned type that has a new and favourable design.

SUMMARY OF THE INVENTION

The cutting insert according to the invention comprises:

- first and second major faces arranged on opposite sides of the cutting insert and serving as top and bottom faces of the cutting insert, wherein the cutting insert has 180° rotational symmetry about a centre axis of the cutting insert that extends between the first and second major faces;
- a peripheral relief surface extending around the cutting insert between the first and second major faces and comprising a first main side surface, a second main side surface, a third main side surface, a fourth main side surface, a first corner side surface, a second corner side surface, a third corner side surface and a fourth corner side surface, wherein:
  - the first corner side surface is located between the first and second main side surfaces,
  - the second corner side surface is located between the second and third main side surfaces,
  - the third corner side surface is located between the third and fourth main side surfaces,
  - the fourth corner side surface is located between the first and fourth main side surfaces,
  - the first and third main side surfaces form a first pair of opposing main side surfaces, and
  - the second and fourth main side surfaces form a second pair of opposing main side surfaces;
- a first side cutting edge formed at an intersection between the first main side surface and the first major face;
- a second side cutting edge formed at an intersection between the third main side surface and the first major face;
- a first main cutting edge, a first secondary cutting edge and a first ramping cutting edge formed at an intersection between the second main side surface and the first major face, wherein the first secondary cutting edge is located between the first main cutting edge and the first ramping cutting edge;
- a second main cutting edge, a second secondary cutting edge and a second ramping cutting edge formed at an intersection between the fourth main side surface and the first major face, wherein the second secondary cutting edge is located between the second main cutting edge and the second ramping cutting edge, and wherein the shortest distance between the opposing first and second main cutting edges is equal to or larger than the shortest distance between the opposing first and second side cutting edges;
- a first curved corner cutting edge formed at an intersection between the first corner side surface and the first major face, wherein the first curved corner cutting edge is located between the first side cutting edge and the first main cutting edge;
- a second curved corner cutting edge formed at an intersection between the second corner side surface and the first major face, wherein the second curved corner cutting edge is located between the first ramping cutting edge and the second side cutting edge;
- a third curved corner cutting edge formed at an intersection between the third corner side surface and the first major face, wherein the third curved corner cutting edge is located between the second side cutting edge and the second main cutting edge; and
- a fourth curved corner cutting edge formed at an intersection between the fourth corner side surface and the first major face, wherein the fourth curved corner cutting edge is located between the second ramping cutting edge and the first side cutting edge.

The first main cutting edge and the first ramping cutting edge extend at an obtuse angle in relation to each other as seen in a plan view of the cutting insert, wherein the second main cutting edge and the second ramping cutting edge extend at a corresponding obtuse angle in relation to each other as seen in a plan view of the cutting insert. A plan view is a view from above, i.e. a top view, and here corresponds to a view of the cutting insert as seen from directly above the first major face in the direction of the centre axis of the cutting insert. In other words, the plan view is a view as seen along the centre axis toward the first major face. Thus, the plan view of the cutting insert constitutes a viewing plane perpendicular to the centre axis of the cutting insert. If the first and second main cutting edges and/or the first and second ramping cutting edges are curved as seen in the plan view of the cutting insert, the extension direction of anyone of these curved cutting edges in the plan view is defined by a straight line that intersects the two opposite end points of the cutting edge in question. The above-mentioned obtuse angle is normally in the range of 95°-160°, preferably 100°-125°, and more preferably 112°±5°.

An imaginary median plane extends halfway between the first and second major faces of the cutting insert perpendicularly to the centre axis of the cutting insert. This median plane is here introduced in order to enable the invention to be defined in an appropriate manner.

The first main cutting edge has a first end connected to the first secondary cutting edge and a second end connected to the first curved corner cutting edge and the second main cutting edge has a first end connected to the second secondary cutting edge and a second end connected to the third curved corner cutting edge, wherein each one of the first and second main cutting edges has one or more sloping parts between its first and second ends with such slope or slopes that its second end is located closer to the median plane than its first end. Thus, as seen in relation to the median plane, the second end of each main cutting edge that faces the adjacent curved corner cutting edge is located at a lower level, i.e. closer to the median plane, than the first end thereof that faces the adjacent secondary cutting edge.

The first ramping cutting edge has a first end connected to the first secondary cutting edge and a second end connected to the second curved corner cutting edge and the second ramping cutting edge has a first end connected to the second secondary cutting edge and a second end connected to the fourth curved corner cutting edge, wherein each one of the first and second ramping cutting edges has one or more sloping parts between its first and second ends with such slope or slopes that its second end is located closer to the median plane than its first end. Thus, as seen in relation to the median plane, the second end of each ramping cutting edge that faces the adjacent curved corner cutting edge is located at a lower level, i.e. closer to the median plane, than the first end thereof that faces the adjacent secondary cutting edge.

According to the invention, the second end of each one of the first and second main cutting edges is located closer to the median plane than the second end of each one of the first and second ramping cutting edges. Thus, as seen in relation to the median plane, the second end of the first main cutting edge is located at a lower level than the second end of the first ramping cutting edge, and the second end of the second main cutting edge is located at a lower level than the second end of the second ramping cutting edge. This feature gives the cutting insert improved performance in ramping operations, including pocketing operations, due to a softer cutting process and decreased risk for chips becoming wedged between the workpiece and the part of the peripheral relief surface associated to the active main cutting edge and the active corner cutting edge. By the active corner cutting edge it is meant the corner cutting edge adjacent to and between the active main cutting edge and the side cutting edge. Furthermore, in pocketing operations said feature implies a reduced risk for chips becoming wedged against the bottom wall and the vertical wall of the pocket that is being machined in the workpiece.

When the cutting insert is mounted in an insert seat in a tool body of a milling tool, one of the main cutting edges is positioned to form an active main cutting edge in the milling tool, wherein the associated ramping cutting edge is positioned to form an active ramping cutting edge in the milling tool and the curved corner cutting edge adjacent to the active main cutting edge is positioned to form an active corner cutting edge in the milling tool. The active main cutting edge will be arranged with its first end facing radially inward in the tool body towards the axis of rotation of the milling tool and with its second end facing radially outward in the tool body away from the axis of rotation of the milling tool, whereas the active ramping cutting edge will have a position radially inwardly of the active main cutting edge. By having the second end of the active main cutting edge located closer to the median plane than the second end of the active ramping cutting edge, the chips formed by the active ramping cutting edge have improved tendency to move in a direction from the active ramping cutting edge towards the active main cutting edge and the active corner cutting edge, i.e. in a direction radially outward in the tool body, instead of moving radially inward from the active ramping cutting edge. If said chips would move radially inward from the active ramping cutting edge, the chips may reach the area below the active main cutting edge and may become wedged between the work piece and the part of the peripheral relief surface associated to the active main cutting edge and the active corner cutting edge.

According to an embodiment of the invention, each one of the first and second main cutting edges slopes towards the median plane along a major part of its length when going from its first end to its second end, preferably along its entire length from its first end to its second end. Hereby, the chips formed by the active ramping cutting edge may move in a smooth manner along the active main cutting edge. Preferably, also each one of the first and second ramping cutting edges slopes towards the median plane along its entire length from its first end to its second end.

According to another embodiment of the invention, each one of the first and second main cutting edges slopes towards the median plane with a slope that is constant or increases as seen along its entire length from its first end to its second end. Hereby, there is no part on the active main cutting edge that may obstruct the movement of the above-mentioned chips along this main cutting edge.

According to another embodiment of the invention, the first main cutting edge extends along a straight or convex line, or along a line which is a series of one or more straight lines in combination with one or more convex lines, when seen in a viewing direction in parallel with the median plane and perpendicular to a straight first line of intersection that intersects the first and second ends of the first main cutting edge, wherein the second main cutting edge extends along a corresponding line when seen in a viewing direction in parallel with the median plane and perpendicular to a straight second line of intersection that intersects the first and second ends of the second main cutting edge. Hereby, the manufacturing of the cutting insert is facilitated and the movement of the above-mentioned chips along the active main cutting edge is improved.

Each one of the first and third curved corner cutting edges has a first end connected to the adjacent main cutting edge and a second end connected to the adjacent side cutting edge. Each one of the first and third curved corner cutting edges has preferably one or more sloping parts between its first and second ends with such slope or slopes that its second end is located closer to the median plane than its first end. Thus, as seen in relation to the median plane, the second end of each one of the first and third curved corner cutting edges is located at a lower level than the first end thereof, and thereby also at a lower level than the second end of the adjacent main cutting edge. Hereby, the chips formed by the active ramping cutting edge may easily continue to move radially outward along the sloping active corner cutting edge after having moved radially outward along the sloping active main cutting edge. Also the chips formed by the active main cutting edge may easily move radially outward along the sloping active corner cutting edge.

According to another embodiment of the invention, each one of the first and third curved corner cutting edges slopes towards the median plane along its entire length from its first end to its second end. Hereby, the chips formed by the active ramping cutting edge may move in a smooth manner along the active corner cutting edge.

According to another embodiment of the invention, each one of the first and third curved corner cutting edges slopes towards the median plane with a slope that is constant or increases as seen along its entire length from its first end to its second end. Hereby, there is no part on the active corner cutting edge that may obstruct the movement of the above-mentioned chips along this corner cutting edge.

According to another embodiment of the invention, the first and third curved corner cutting edges are so configured that in every point along anyone of the first and third curved corner cutting edges the curved corner cutting edge has a slope which is equal to or larger than the smallest slope of the adjacent main cutting edge in any point along this main cutting edge. Hereby, the active corner cutting edge is efficiently prevented from obstructing the movement of the above-mentioned chips radially outward along the active corner cutting edge.

According to another embodiment of the invention, the first and third curved corner cutting edges are so configured that in every point along anyone of the first and third curved corner cutting edges the distance between the curved corner cutting edge and the median plane is equal to or smaller than the distance between the second end of the adjacent main cutting edge and the median plane. Hereby, the movement of the above-mentioned chips radially outward along the active corner cutting edge is facilitated.

According to another embodiment of the invention, the first main cutting edge and the first curved corner cutting edge are so configured that, when seen in a viewing direction in parallel with the median plane and perpendicular to a straight first line of intersection that intersects the first and second ends of the first main cutting edge, the first curved corner cutting edge is located between the median plane and every tangent that can be drawn to the points along the first main cutting edge, wherein the second main cutting edge and the third curved corner cutting edge are so configured that, when seen in a viewing direction in parallel with the median plane and perpendicular to a straight second line of intersection that intersects the first and second ends of the second main cutting edge, the third curved corner cutting edge is located between the median plane and every tangent that can be drawn to the points along the second main cutting edge. Hereby, the active corner cutting edge is efficiently prevented from obstructing the movement of the above-mentioned chips radially outward along the active corner cutting edge. If the first main cutting edge comprises a section that extends in a straight line when seen in the viewing direction in parallel with the median plane and perpendicular to said first line of intersection, an imaginary straight line that is aligned with and forms an extension of this section is here considered as equivalent to a tangent to any point along this section. If the second main cutting edge comprises a section that extends in a straight line when seen in the viewing direction in parallel with the median plane and perpendicular to said second line of intersection, an imaginary straight line that is aligned with and forms an extension of this section is here considered as equivalent to a tangent to any point along this section.

Another embodiment of the invention is characterized in:

that a first chip breaker associated to the first main cutting edge is formed on the first major face, the first chip breaker extending on the first major face along at least a part of the first main cutting edge, preferably along the entire length of the first main cutting edge, wherein the first chip breaker has a first end facing towards the first ramping cutting edge and an opposite second end facing towards the first main side surface, and wherein the first chip breaker is preferably also associated to and configured to extend along the first curved corner cutting edge; and that a second chip breaker associated to the second main cutting edge is formed on the first major face, the second chip breaker extending on the first major face along at least a part of the second main cutting edge, preferably along the entire length of the second main cutting edge, wherein the second chip breaker has a first end facing towards the second ramping cutting edge and an opposite second end facing towards the third main side surface, and wherein the second chip breaker is preferably also associated to and configured to extend along the third curved corner cutting edge.

The chip breakers will enhance an advantageous forming or fragmentation of the chips formed by the active main cutting edge and contribute to achieve an advantageous direction of movement of these chips, and will thereby improve the cutting process. The chip breakers will also make it easier for the chips formed by the active ramping cutting edge to move radially outward and will thereby enhance chip evacuation of these chips. The first end of the first chip breaker may adjoin, more or less continuously, to another chip breaker that is associated to the first secondary cutting edge and possibly also to the first ramping cutting edge, and the first end of the second chip breaker may adjoin, more or less continuously, to another chip breaker that is associated to the second secondary cutting edge and possibly also to the second ramping cutting edge.

The second end of the first chip breaker preferably adjoins to the second end of the first curved corner cutting edge, i.e. to the end that is connected to the first side cutting edge, and the second end of the second chip breaker preferably adjoins to the second end of the third curved corner cutting edge, i.e. to the end that is connected to the second side cutting edge. The second end of the first chip breaker preferably adjoins also to a part of the first side cutting edge and the second end of the second chip breaker preferably adjoins also to a part of the second side cutting edge.

Another embodiment of the invention is characterized in:

that the first chip breaker has an essentially U-shaped or V-shaped profile as seen in a section across the first chip breaker in parallel with a longitudinal plane of the cutting insert that extends halfway between the first and third main side surfaces perpendicularly to the median plane and that contains the centre axis, to thereby form an elongated first valley on the first major face that extends between the first and second ends of the first chip breaker; and that the second chip breaker has an essentially U-shaped or V-shaped profile as seen in a section across the second chip breaker in parallel with said longitudinal plane, to thereby form an elongated second valley on the first major face that extends between the first and second ends of the second chip breaker. Hereby, an elongated valley is provided on the first major face from a region adjacent to the active ramping cutting edge and along the active main cutting edge in the direction towards the active side cutting edge. This valley will act as a conventional chip breaker for the chips formed by the active main cutting edge and will also facilitate the above-mentioned outwardly directed movement of the chips formed by the active ramping cutting edge.

According to another embodiment of the invention, the first valley has a depth that increases as seen in a direction along the first chip breaker from the first end thereof to the second end thereof, wherein the second valley has a depth that increases as seen in a direction along the second chip breaker from the first end thereof to the second end thereof. The outwardly directed movement of the chips formed by the active ramping cutting edge is further facilitated by this design of the valleys formed by the first and second chip breakers.

According to another embodiment of the invention, the first valley has a width that increases as seen in a direction along the first chip breaker from the first end thereof to the second end thereof, wherein the second valley has a width that increases as seen in a direction along the second chip breaker from the first end thereof to the second end thereof. The outwardly directed movement of the chips formed by the active ramping cutting edge is further facilitated by this design of the valleys formed by the first and second chip breakers. The width of a valley here refers to the distance between two opposite longitudinal edges of the valley as measured in a plane that extends in parallel with the above-mentioned longitudinal plane of the cutting insert.

According to another embodiment of the invention, each one of the first and second main cutting edges, and preferably also each one of the first and second secondary cutting edges, has a nominal rake angle that is positive or neutral. Hereby, the outwardly directed movement of the chips formed by the active ramping cutting edge is facilitated.

The cutting insert of the present invention is with advantage a single-sided and two-way indexable cutting insert, wherein the second major face preferably is flat and extends perpendicularly to the centre axis. Hereby, the manufacturing of the cutting insert is facilitated. However, the cutting insert of the present invention may as an alternative be a double-sided and four-way indexable cutting insert with the same arrangement of cutting edges around both of the above-mentioned major faces of the cutting insert.

Further advantageous features of the cutting insert according to the present invention will appear from the description following below.

The invention also relates to a high feed milling tool comprising a cutting insert of the above-mentioned type.

Further advantageous features of the high feed milling tool according to the present invention will appear from the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1A:
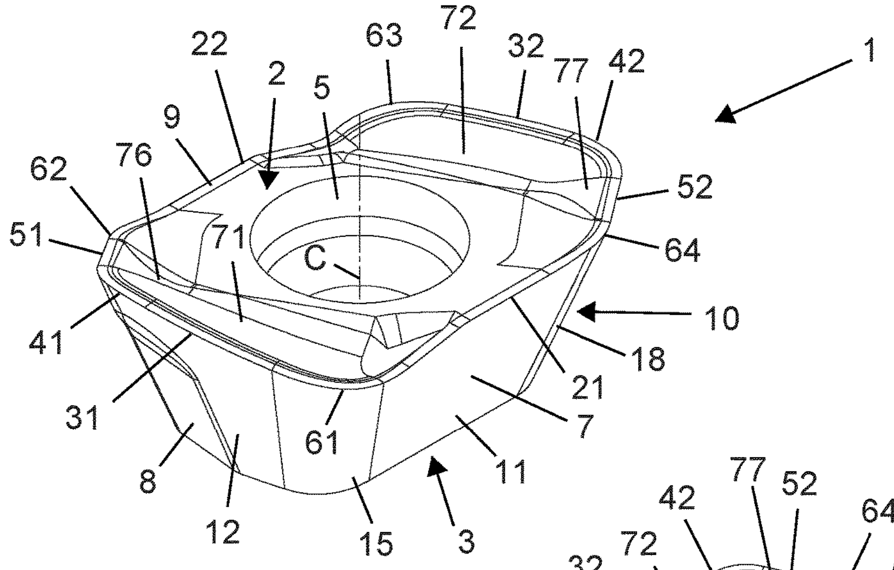
FIGS. 1*a*-1*c* are perspective views from different directions of a cutting insert according to a first embodiment of the present invention.
Figure 1B:
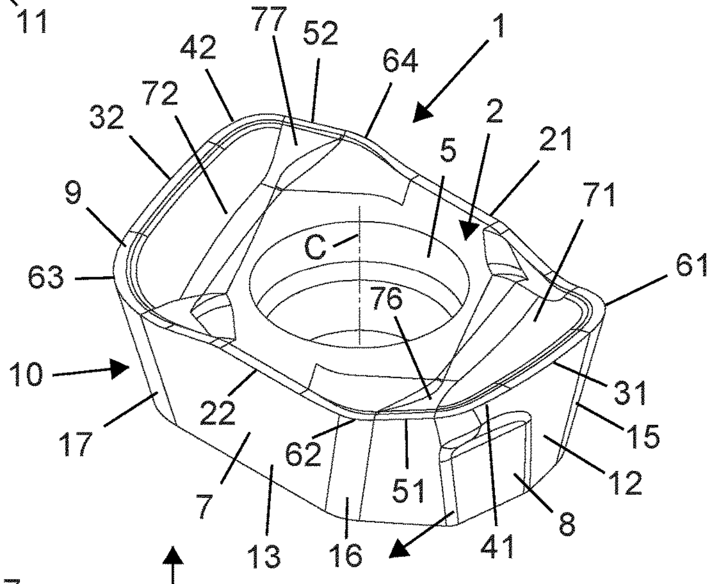
Figure 1C:
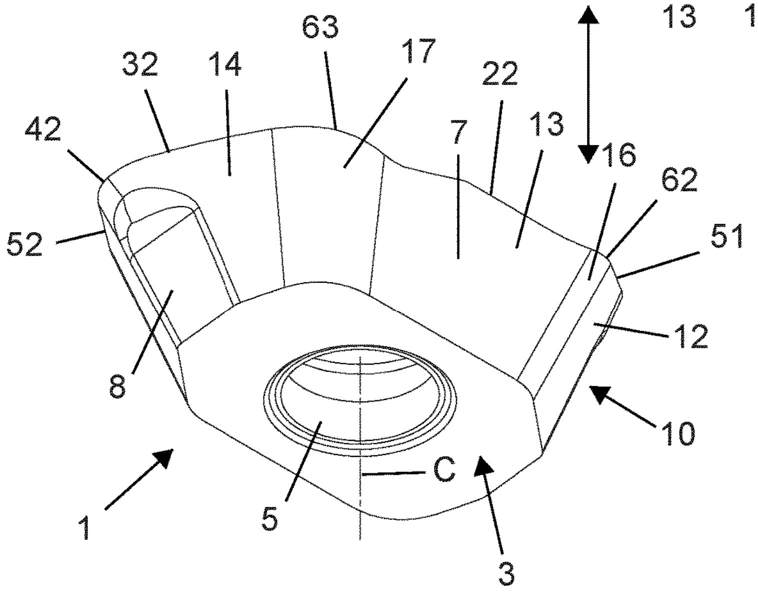

Two different embodiments of a cutting insert 1 according to the present invention are illustrated in FIGS. 1*a*-1*j* and 2*a*-2*j.* The cutting insert 1 is configured for use in high-feed milling and is configured to be used in a milling tool 80, for instance a milling tool of the type illustrated in FIGS. 3-6. The cutting insert 1 is particularly configured for use in ramping operations, including pocketing operations.

The cutting insert 1 comprises first and second major faces 2, 3 arranged on opposite sides of the cutting insert 1 and serving as top and bottom faces of the cutting insert. The cutting insert 1 has a centre axis C, which extends between the first and second major faces 2, 3, wherein the cutting insert 1 has 180° rotational symmetry about the centre axis C. A median plane MP, which constitutes an imaginary plane, extends halfway between the first and second major faces 2, 3 perpendicularly to the centre axis C.

In the illustrated embodiments, the cutting insert 1 is provided with a through hole 5, which extends centrally through the cutting insert between the first and second major faces 2, 3. The through hole 5 is configured to receive a fastening element 6 (see FIGS. 3, 5 and 6), for instance in the form of a screw, by means of which the cutting insert 1 may be releasably fixed to an insert seat 84 of a milling tool 80. The centre axis C of the cutting insert 1 coincides with the centre axis of the through hole 5. The cutting insert 1 may as an alternative lack a through hole 5, wherein the cutting insert is configured to be releasably fixed to an insert seat of a milling tool by means of suitable clamping means.

A peripheral relief surface 10 extends around the cutting insert 1 between the first and second major faces 2, 3. The peripheral relief surface 10 comprises a first main side surface 11, a second main side surface 12, a third main side surface 13 and a fourth main side surface 14. The peripheral relief surface 10 also comprises:

- a first corner side surface 15 located between the first and second main side surfaces 11, 12;
- a second corner side surface 16 located between the second and third main side surfaces 12, 13;
- a third corner side surface 17 located between the third and fourth main side surfaces 13, 14; and
- fourth corner side surface 18 located between the first and fourth main side surfaces 11, 14.

The first and third main side surfaces 11, 13 form a first pair of opposing main side surfaces and the second and fourth main side surfaces 12, 14 form a second pair of opposing main side surfaces. A longitudinal plane LP (see FIGS. 1*d* and 2*d*), which constitutes an imaginary plane, extends across the cutting insert 1 halfway between the first and third main side surfaces faces 11, 13 perpendicularly to the median plane MP and contains the centre axis C. Thus, the centre axis C has its extension in this longitudinal plane LP. A central plane CP, which constitutes another imaginary plane, extends across cutting insert 1 perpendicularly to the median plane MP and perpendicularly to the longitudinal plane LP and contains the centre axis C. Thus, the centre axis C has its extension also in this central plane CP and it consequently extends along an intersection between the longitudinal plane LP and the central plane C. The longitudinal plane LP extends between the second and fourth main side surfaces 12, 14 and the central plane CP extends between the first and third main side surfaces 11, 13.

A first side cutting edge 21 extends along the first main side surface 11 and is formed at an intersection between the first main side surface 11 and the first major face 2. A second side cutting edge 22 extends along the third main side surface 13 and is formed at an intersection between the third main side surface 13 and the first major face 2.

A first main cutting edge 31, a first secondary cutting edge 41 and a first ramping cutting edge 51 extend one after the other along the second main side surface 12 and are formed at an intersection between the second main side surface 12 and the first major face 2. The first secondary cutting edge 41 is located between the first main cutting edge 31 and the first ramping cutting edge 51.

A second main cutting edge 32, a second secondary cutting edge 42 and a second ramping cutting edge 52 extend one after the other along the fourth main side surface 14 and are formed at an intersection between the fourth main side surface 14 and the first major face 2. The second secondary cutting edge 42 is located between the second main cutting edge 32 and the second ramping cutting edge 52.

Each one of the first and second secondary cutting edges 41, 42 comprises a surface-wiping cutting edge section 43.

Figure 1D:
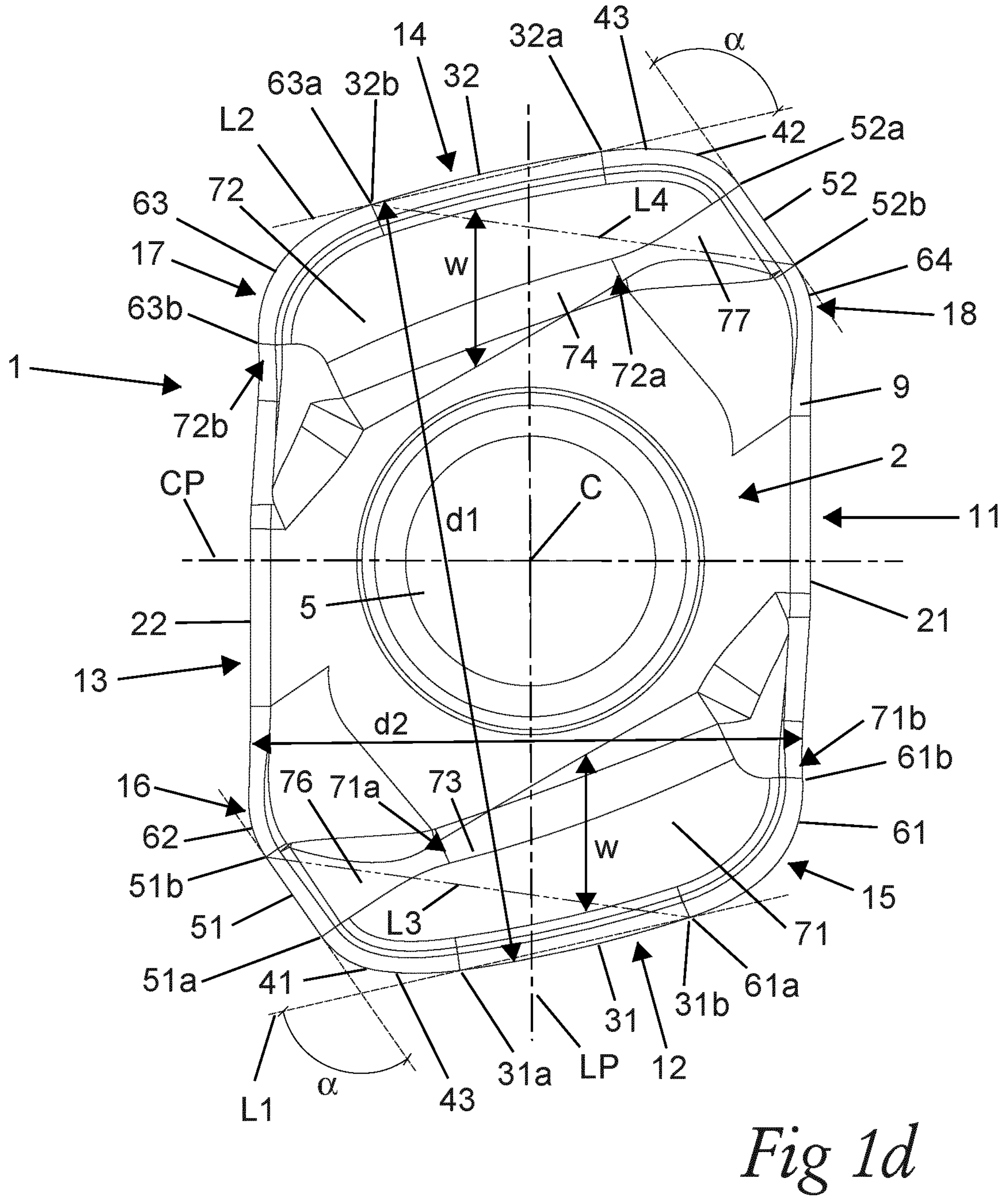
FIG. 1*d* is a plan view from above of the cutting insert of FIGS. 1*a*-1*c,*
Figure 1E:
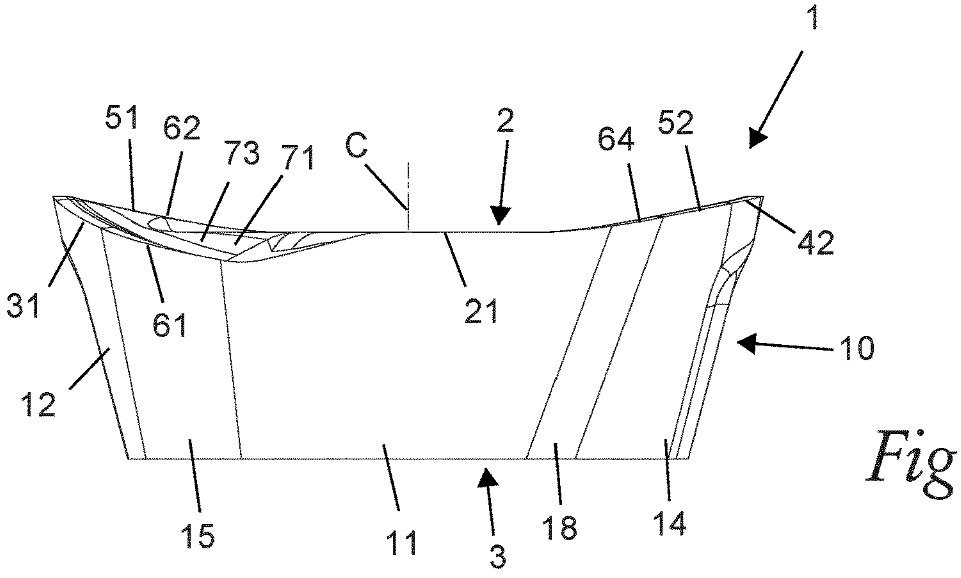
FIGS. 1*e*-1*j* are lateral views from different sides of the cutting insert of FIGS. 1*a*-1*c,*
Figure 1F:
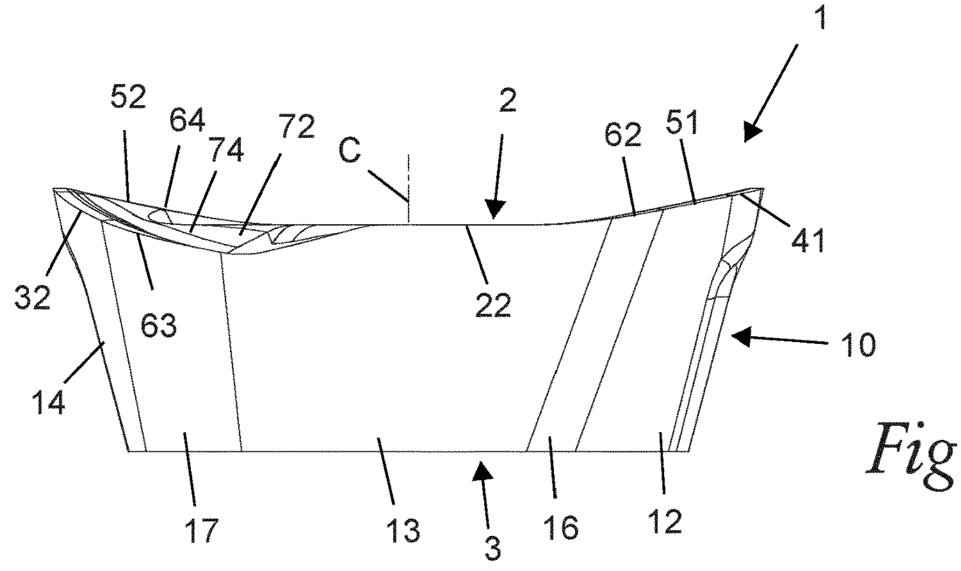
Figure 1G:
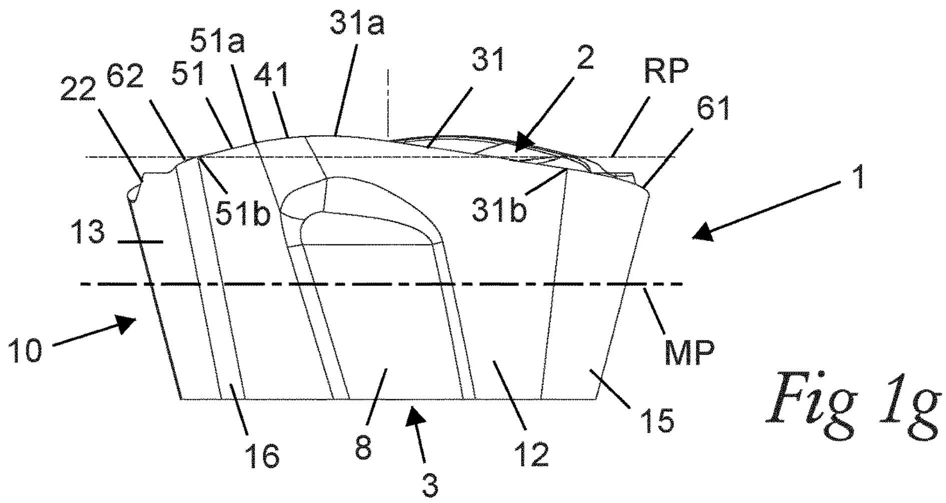
Figure 1H:
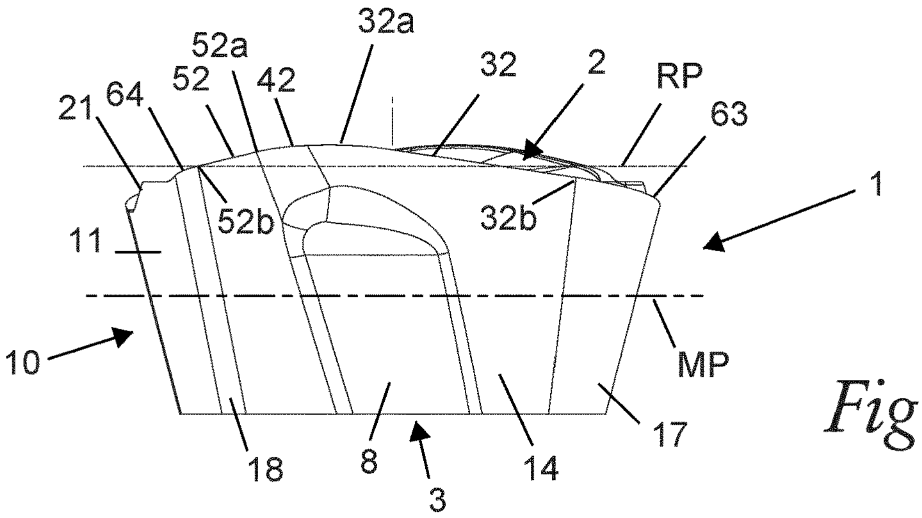
Figure 1I:
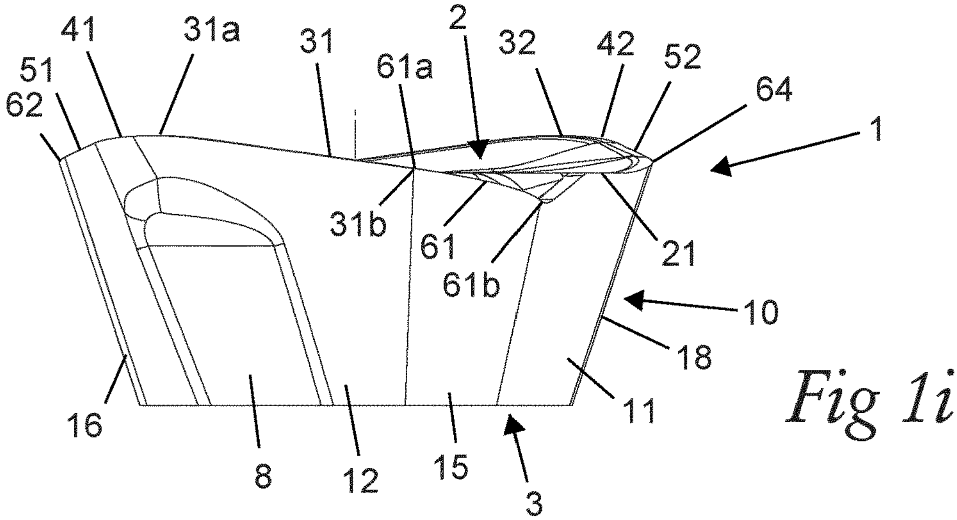
Figure 1J:
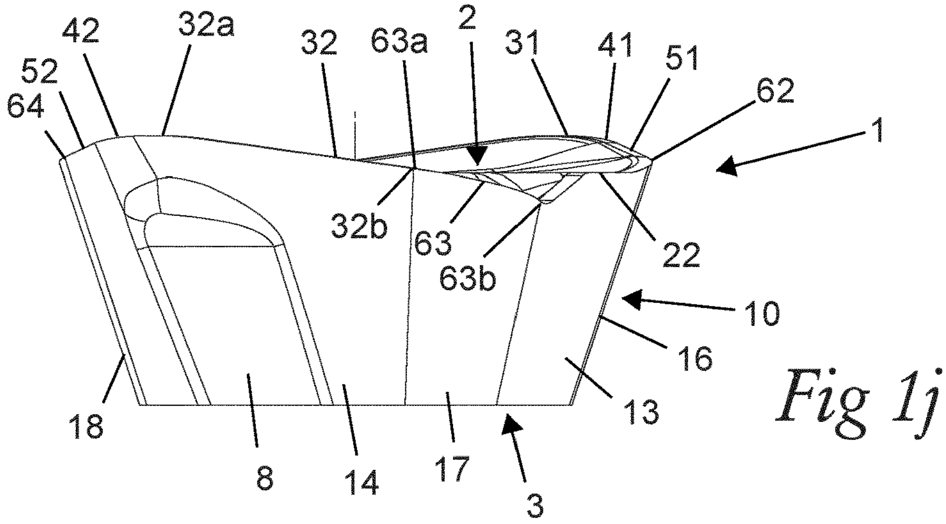
Figure 2A:
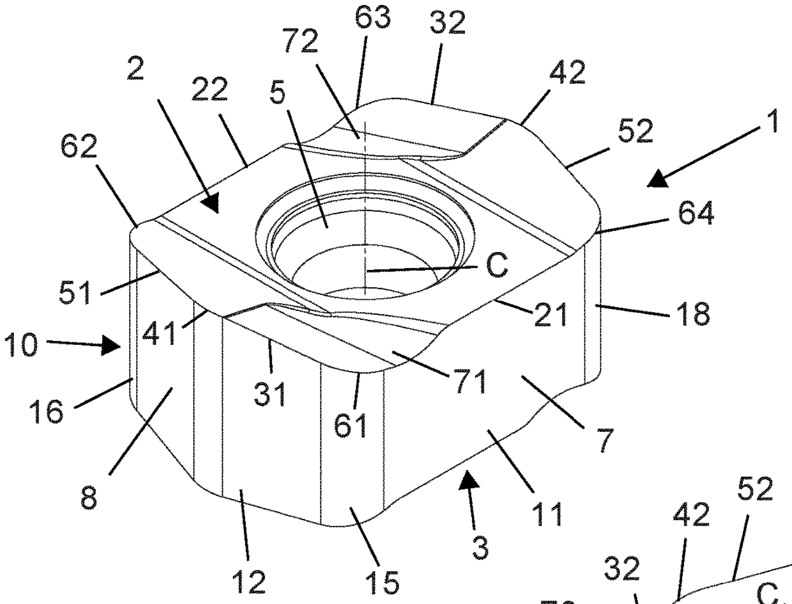
FIGS. 2*a*-2*c* are perspective views from different directions of a cutting insert according to a second embodiment of the invention.
Figure 2B:
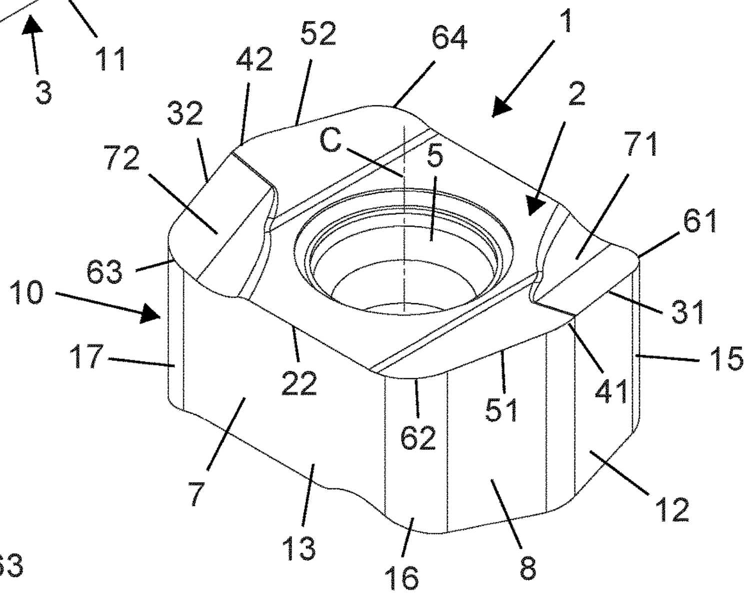
Figure 2C:
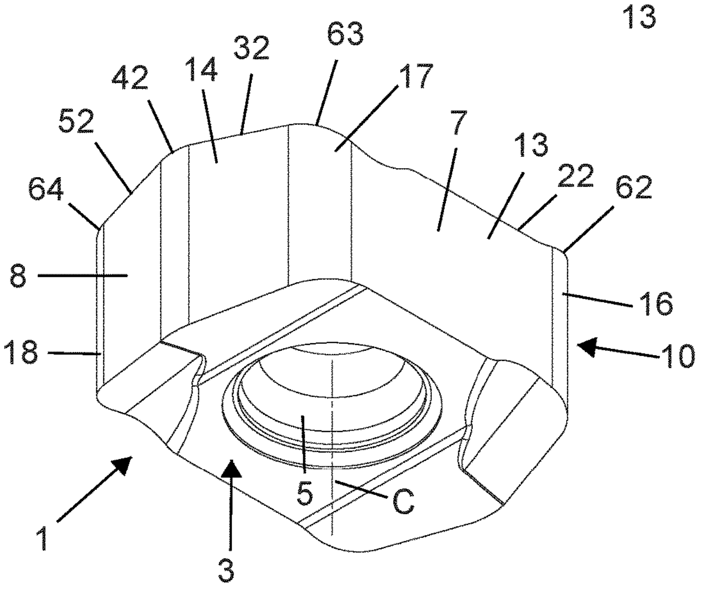
Figure 2D:
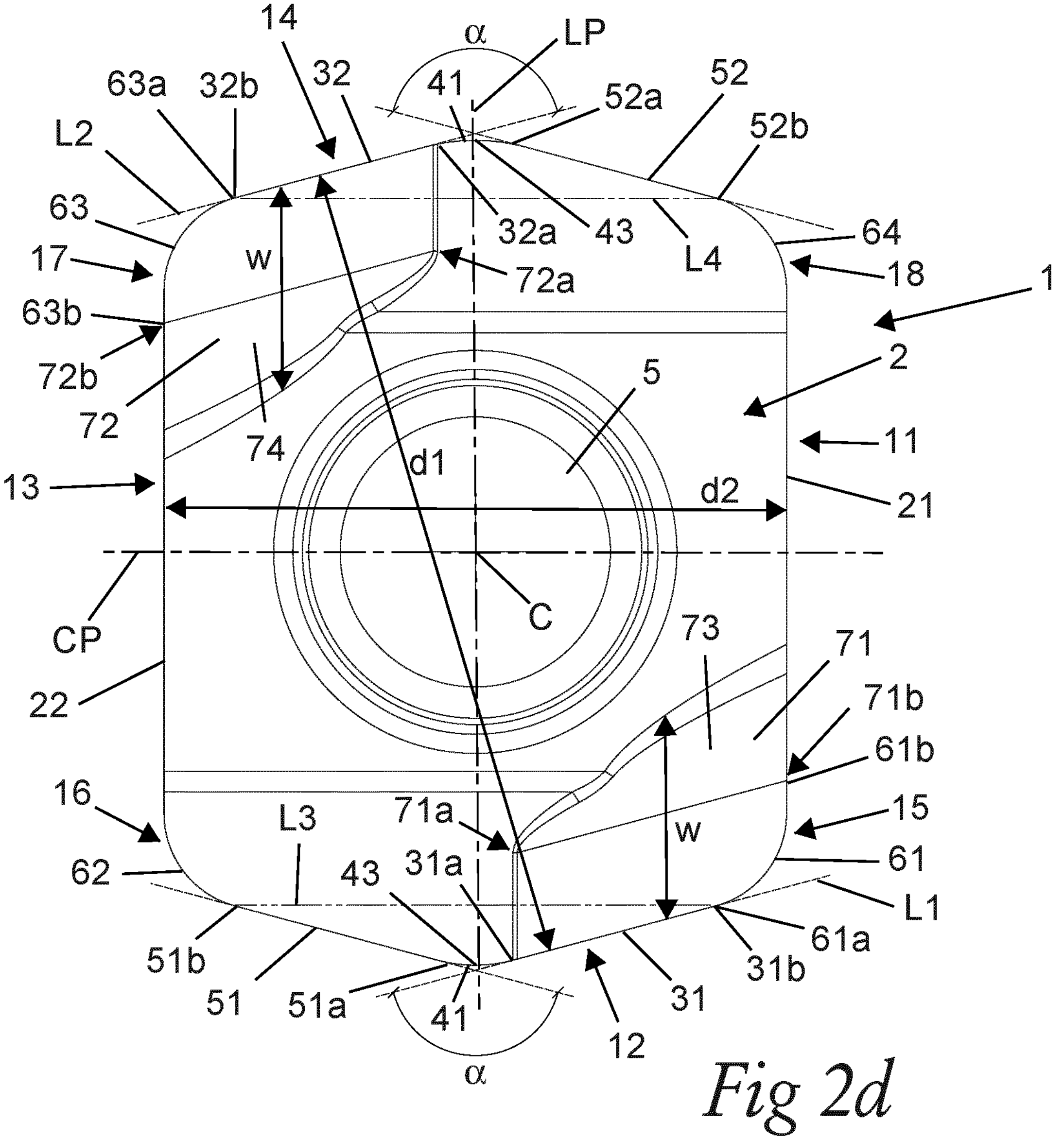
FIG. 2*d* is a plan view from above of the cutting insert of FIGS. 2*a*-2*c,*
Figure 2E:
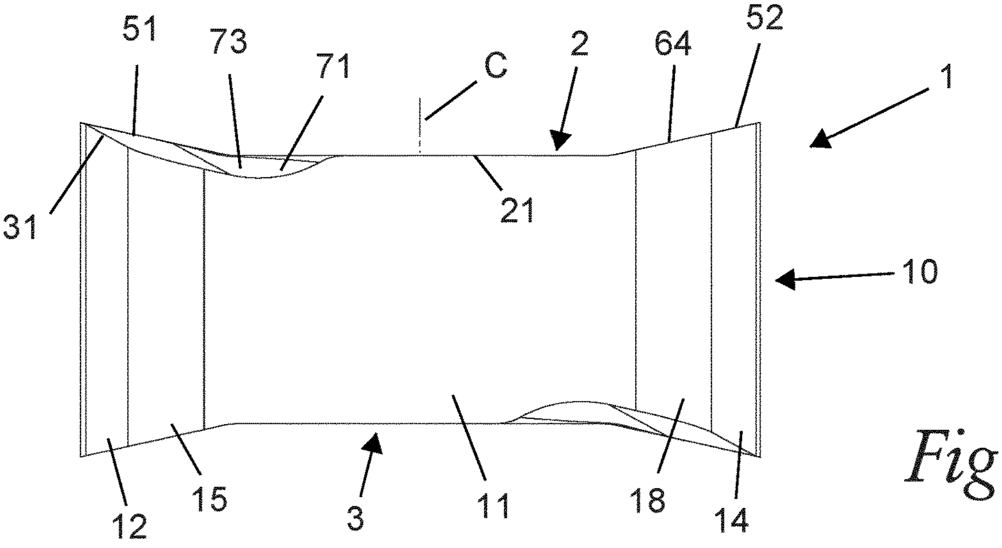
FIGS. 2*e*-2*j* are lateral views from different sides of the cutting insert of FIGS. 2*a*-2*c,*
Figure 2F:
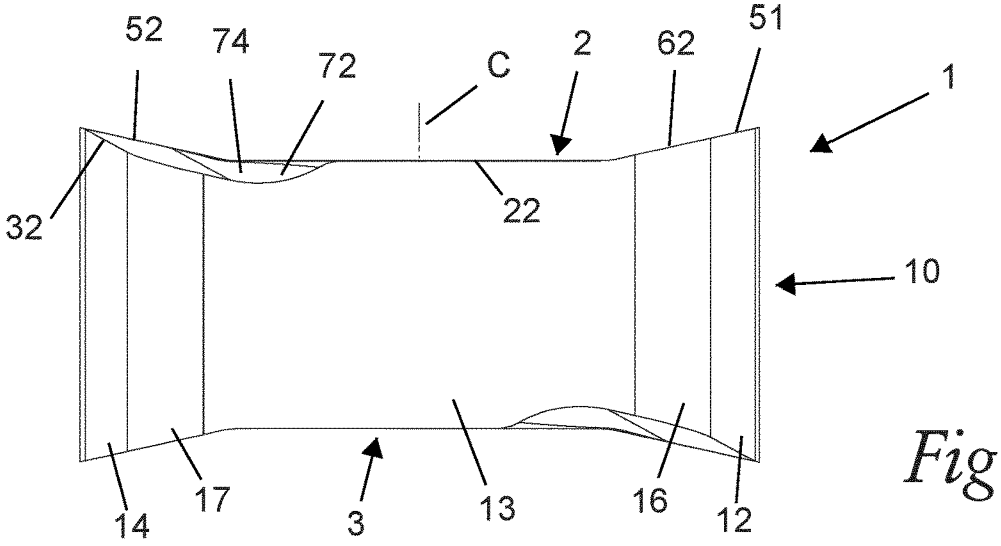
Figure 2G:
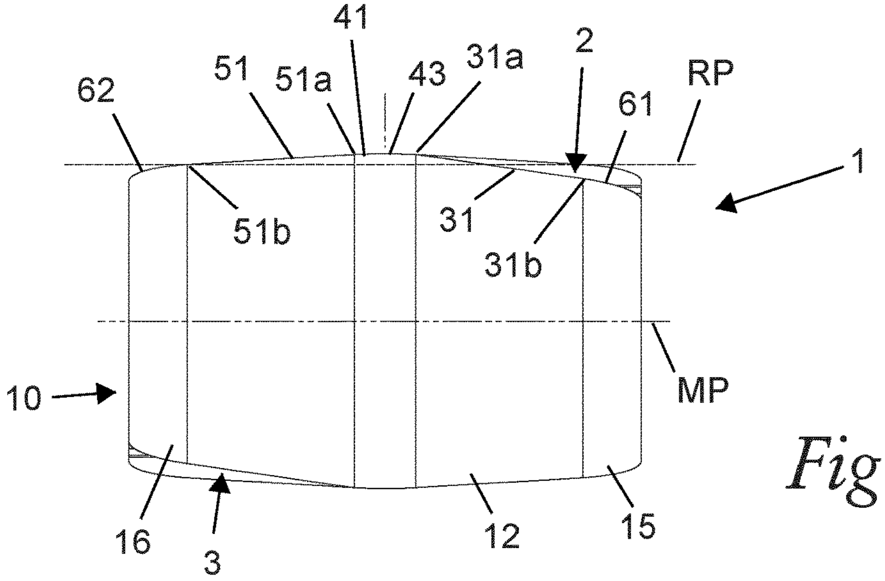
Figure 2H:
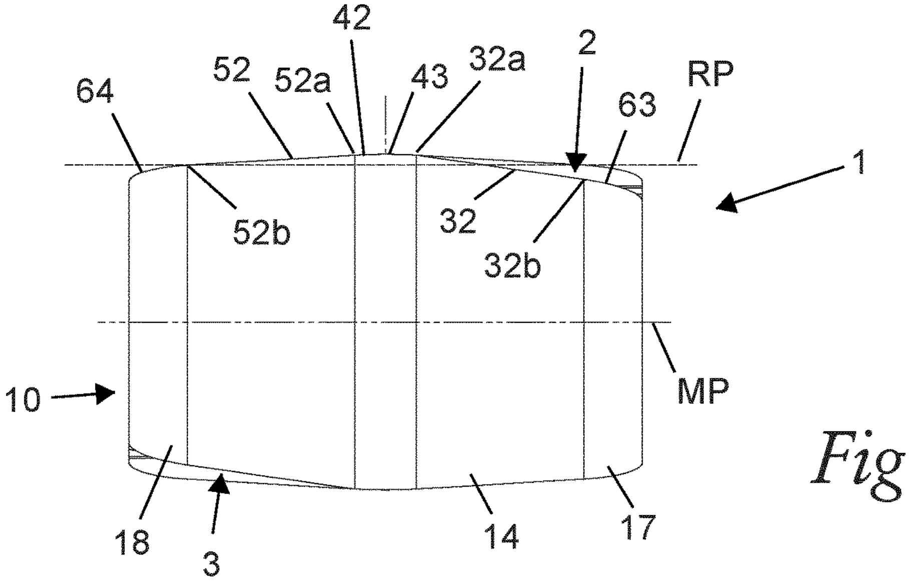

The first and second side cutting edges 21, 22 are located opposite each other on opposite sides of the longitudinal plane LP, as illustrated in FIGS. 1*d* and 2*d*. The first and second main cutting edges 31, 32 are located opposite each other on opposite sides of the central plan CP. In the embodiment illustrated in FIGS. 2*a*-2*j*, the first and second main cutting edges 31, 32 are also located on opposite sides of the longitudinal plane LP. The first and second secondary cutting edges 41, 42 are located opposite each other on opposite sides of the central plan CP. In the embodiment illustrated in FIGS. 1*a*-1*j*, the first and second secondary cutting edges 41, 42 are also located on opposite sides of the longitudinal plane LP. The first and second ramping cutting edges 51, 52 are located opposite each other on opposite sides of the central plan CP and also on opposite sides of the longitudinal plane LP.

The cutting insert 1 of the present invention has such a shape that the shortest distance d1 between the opposing first and second main cutting edges 31, 32 is equal to or larger than the shortest distance d2 between the opposing first and second side cutting edges 21, 22. The relationship between distance d1 and distance d2 is preferably such that the quota d1/d2 is larger than 1.1, more preferably between 1.1 and 2.0, even more preferably between 1.2 and 1.7, and most preferably between 1.36 and 1.46.

As illustrated in FIGS. 1*d* and 2*d*, the cutting insert 1 of the present invention also has such a shape that the first main cutting edge 31 and the first ramping cutting edge 51 extend at an obtuse angle α in relation to each other as seen in a plan view of the cutting insert 1, i.e. when seen in a viewing direction from above, wherein the second main cutting edge 32 and the second ramping cutting edge 52 extend at a corresponding obtuse angle α in relation to each other as seen in a plan view of the cutting insert. In the embodiment illustrated in FIGS. 1*a*-1*j*, the first and second main cutting edges 31, 32 are slightly convex when seen in the plan view. In this case, the angle α between the first ramping cutting edge 51 and the first main cutting edge 31 is measured between a straight line that extends in the plan view along the first ramping cutting edge 51 and a straight line that intersects the two opposite end points 31*a*, 31*b* of the first main cutting edge 31, wherein the angle α between the second ramping cutting edge 52 and the second main cutting edge 32 is measured in a corresponding manner. The angle α is approximately 112° in the embodiment illustrated in FIGS. 1*a*-1*j* and approximately 150° in the embodiment illustrated in FIGS. 2*a*-2*j*, but it could have any other suitable value, preferably in the range of 95°-160°, and more preferably in the range of 100°-125°.

A first curved corner cutting edge 61 extends along the first corner side surface 15 and is formed at an intersection between the first corner side surface 15 and the first major face 2. A second curved corner cutting edge 62 extends along the second corner side surface 16 and is formed at an intersection between the second corner side surface 16 and the first major face 2. A third curved corner cutting edge 63 extends along the third corner side surface 17 and is formed at an intersection between the third corner side surface 17 and the first major face 2. A fourth curved corner cutting edge 64 extends along the fourth corner side surface 18 and is formed at an intersection between the fourth corner side surface 18 and the first major face 2. The first curved corner cutting edge 61 extends between the first side cutting edge 21 and the first main cutting edge 31, the second curved corner cutting edge 62 extends between the first ramping cutting edge 51 and the second side cutting edge 22, the third curved corner cutting edge 63 extends between the second side cutting edge 22 and the second main cutting edge 32, and the fourth curved corner cutting edge 64 extends between the second ramping cutting edge 52 and the first side cutting edge 21. The first, second, third and fourth curved corner cutting edges 61, 62, 63, 64 extend along a respective radiused corner on the cutting insert. The first and third curved corner cutting edges 61, 63 are located diagonally opposite each other on opposite sides of the longitudinal plane LP and also on opposite sides of the central plan CP. The second and fourth curved corner cutting edges 62, 64 are located diagonally opposite each other on opposite sides of the longitudinal plane LP and also on opposite sides of the central plan CP.

The above-mentioned 180° rotational symmetry about the centre axis C implies:

that the first and second side cutting edges 21, 22 are identical to each other, within manufacturing tolerances;

that the first and second main cutting edges 31, 32 are identical to each other, within manufacturing tolerances;

that the first and second secondary cutting edges 41, 42 are identical to each other, within manufacturing tolerances;

that the first and second ramping cutting edges 51, 52 are identical to each other, within manufacturing tolerances;

that the first and third curved corner cutting edges 61, 63 are identical to each other, within manufacturing tolerances; and that the second and fourth curved corner cutting edges 62, 64 are identical to each other, within manufacturing tolerances.

The first main cutting edge 31 has a first end 31*a* connected to the first secondary cutting edge 41 and a second end 31*b* connected to the first curved corner cutting edge 61. The second main cutting edge 32 has a first end 32*a* connected to the second secondary cutting edge 42 and a second end 32*b* connected to the third curved corner cutting edge 63. The first main cutting edge 31 has one or more sloping parts between its first and second ends 31*a*, 31*b* with such slope or slopes that its second end 31*b* is located closer to the median plane MP than its first end 31*a*. The second main cutting edge 32 slopes in the same manner as the first main cutting edge 31 and has one or more sloping parts between its first and second ends 32*a*, 32*b* with such slope or slopes that its second end 32_b_ is located closer to the median plane MP than its first end 32_a_.

The first ramping cutting edge 51 has a first end 51_a_ connected to the first secondary cutting edge 41 and a second end 51_b_ connected to the second curved corner cutting edge 62. The second ramping cutting edge 52 has a first end 52_a_ connected to the second secondary cutting edge 42 and a second end 52_b_ connected to the fourth curved corner cutting edge 64. The first ramping cutting edge 51 has one or more sloping parts between its first and second ends 51_a_, 51_b_ with such slope or slopes that its second end 51_b_ is located closer to the median plane MP than its first end 51_a_. The second ramping cutting edge 52 slopes in the same manner as the first ramping cutting edge 51 and has one or more sloping parts between its first and second ends 52_a_, 52_b_ with such slope or slopes that its second end 52_b_ is located closer to the median plane MP than its first end 52_a_.

According to the invention, the second end 31_b_ of the first main cutting edge 31 is located closer to the median plane MP than the second end 51_b_ of the first ramping cutting edge 51, as illustrated in FIGS. 1_g_ and 2_g_, and the second end 32_b_ of the second main cutting edge 32 is in the corresponding manner located closer to the median plane MP than the second end 52_b_ of the second ramping cutting edge 52, as illustrated in FIGS. 1_h_ and 2_h_. Thus, the second end 31_b_, 32_b_ of the main cutting edges 31, 32 is located between the median plane MP and an imaginary reference plane RP that intersects the second end 51_b_, 52_b_ of the ramping cutting edges 51, 52 and extends in parallel with the median plan MP, as illustrated in FIGS. 1_g_, 1_h_, 2_g_ and 2_h_. FIGS. 1_g_ and 2_g_ show the cutting insert 1 in a viewing direction in parallel with the median plane MP and perpendicular to a straight line of intersection L3 that intersects the second end 31_b_ of the first main cutting edge 31 and the second end 51_b_ of the first ramping cutting edge 51, whereas FIGS. 1_h_ and 2_h_ show the cutting insert 1 in a viewing direction in parallel with the median plane MP and perpendicular to a straight line of intersection L4 that intersects the second end 32_b_ of the second main cutting edge 32 and the second end 52_b_ of the second ramping cutting edge 52.

In the illustrated embodiments, each one of the ramping cutting edges 51, 52 slopes towards the median plane MP along its entire length from its first end 51_a_, 52_a_ to its second end 51_b_, 52_b_. Each one of the main cutting edges 31, 32 slopes towards the median plane MP along a major part of its length from its first end 31_a_, 32_a_ to its second end 31_b_, 32_b_. The main cutting edges 31, 32 and/or the ramping cutting edges 51, 52 may as an alternative comprise one or more sections that extend in parallel with the median plane MP. The main cutting edges 31, 32 may have a convex section adjacent to its first end 31_a_, 32_a_. As a further alternative, this convex section may have a part that slopes away from the median plane MP, when seen along the main cutting edge from its first end toward its second end, in order to create a smoother transition between the ramping cutting edge 51, 52 and the main cutting edge 31, 32. Each one of the main cutting edges 31, 32 and the ramping cutting edges 51, 52 preferably slopes towards the median plane MP with a slope that is constant or increases as seen along its entire length from its first end 31_a_, 32_a_, 51_a_, 52_a_ to its second end 31_b_, 32_b_, 51_b_, 52_b_.

In the embodiment illustrated in FIGS. 1_a_-1_j_, the first main cutting edge 31 extends along a straight or essentially straight line to a major part and has a convex part adjacent to its first end 31_a_, when seen in a viewing direction in parallel with the median plane MP and perpendicular to a straight line of intersection L1 that intersects the first and second ends 31_a_, 31_b_ of the first main cutting edge, as illustrated in FIG. 1_i_, wherein the second main cutting edge 32 extends along a corresponding straight or essentially straight line to a major part and has a convex part adjacent to its first end 32_a_, when seen in a viewing direction in parallel with the median plane MP and perpendicular to a straight line of intersection L2 that intersects the first and second ends 32_a_, 32_b_ of the second main cutting edge 32, as illustrated in FIG. 1_j_. Also in the embodiment illustrated in FIGS. 2_a_-2_j_, the first and second main cutting edges 31, 32 extends along a straight line, or at least essentially straight line, when seen in the last-mentioned viewing directions, as illustrated in FIGS. 2_i_ and 2_j_.

The first curved corner cutting edge 61 has a first end 61_a_ connected to the second end 31_b_ of the first main cutting edge 31 and a second end 61_b_ connected to the first side cutting edge 21. The third curved corner cutting edge 63 has a first end 63_a_ connected to the second end 32_b_ of the second main cutting edge 32 and a second end 63_b_ connected to the second side cutting edge 22. The first and third curved corner cutting edges 61, 63 may extend in parallel with the median plane MP. However, in the illustrated embodiments, the first curved corner cutting edge 61 has one or more sloping parts between its first and second ends 61_a_, 61_b_ with such slope or slopes that its second end 61_b_ is located closer to the median plane MP than its first end 61_a_, wherein the third curved corner cutting edge 63 slopes in the same manner as the first curved corner cutting edge 61 and has one or more sloping parts between its first and second ends 63_a_, 63_b_ with such slope or slopes that its second end 63_b_ is located closer to the median plane MP than its first end 63_a_.

In the illustrated embodiments, each one of the first and third curved corner cutting edges 61, 63 slopes towards the median plane MP along its entire length from its first end 61_a_, 63_a_ to its second end 61_b_, 63_b_, but they may as an alternative comprise one or more sections that extend in parallel with the median plane MP. Each one of the first and third curved corner cutting edges 61, 63 preferably slopes towards the median plane MP with a slope that is constant or increases as seen along its entire length from its first end 61_a_, 63_a_ to its second end 61_b_, 63_b_.

In every point along its extension, the first curved corner cutting edge 61 has preferably a slope which is equal to or larger than the smallest slope of the first main cutting edge 31 in any point along the first main cutting edge 31, wherein the third curved corner cutting edge 63 in every point along its extension has a slope which is equal to or larger than the smallest slope of the second main cutting edge 32 in any point along the second main cutting edge 32.

In every point along the first curved corner cutting edge 61, the distance between the first curved corner cutting edge 61 and the median plane MP is preferably equal to or smaller than the distance between the second end 31_b_ of the first main cutting edge 31 and the median plane MP, wherein the distance between the third curved corner cutting edge 63 and the median plane MP, in every point along the third curved corner cutting edge 63, is equal to or smaller than the distance between the second end 32_b_ of the second main cutting edge 32 and the median plane MP.

Figure 2I:
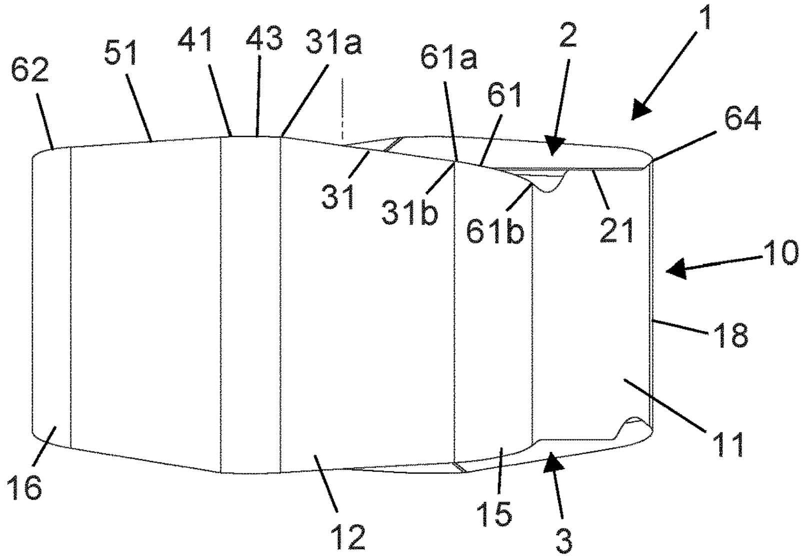
Figure 2J:
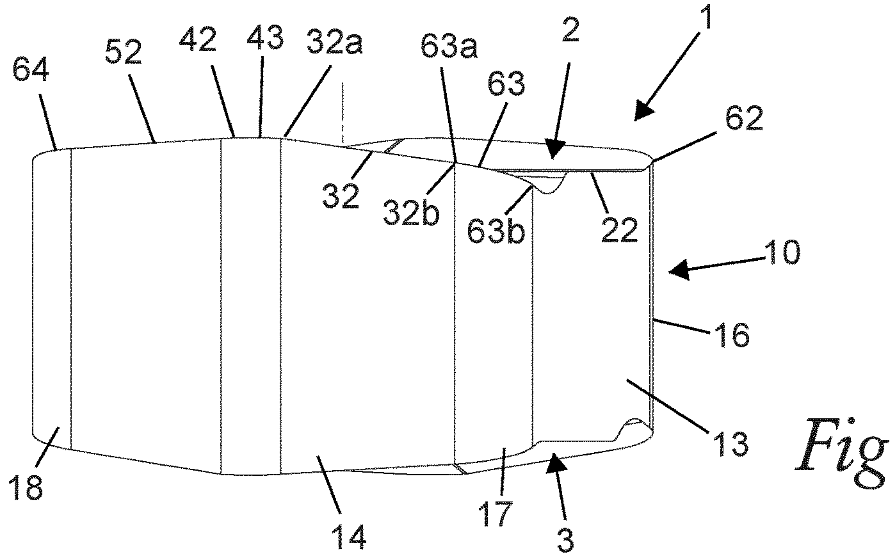
Figure 3:
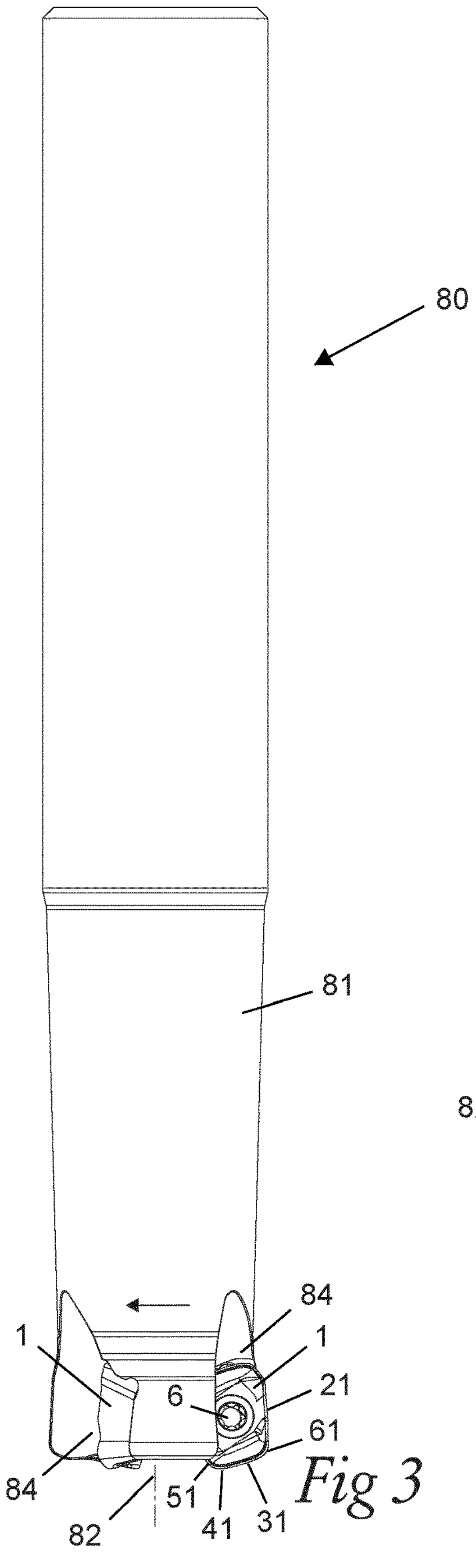
FIG. 3 is a lateral view of a milling tool provided with cutting inserts according to the embodiment illustrated in FIGS. 1*a*-1*j,*
Figure 4:
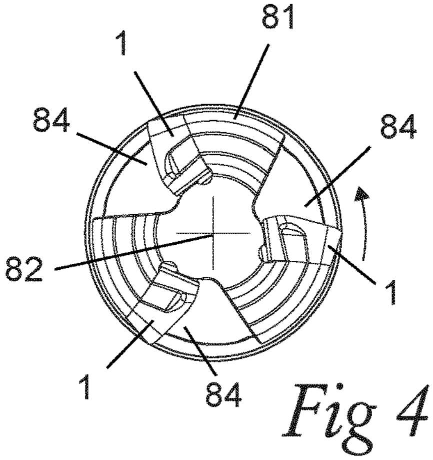
FIG. 4 is a front view of the milling tool of FIG. 3.
Figure 5:
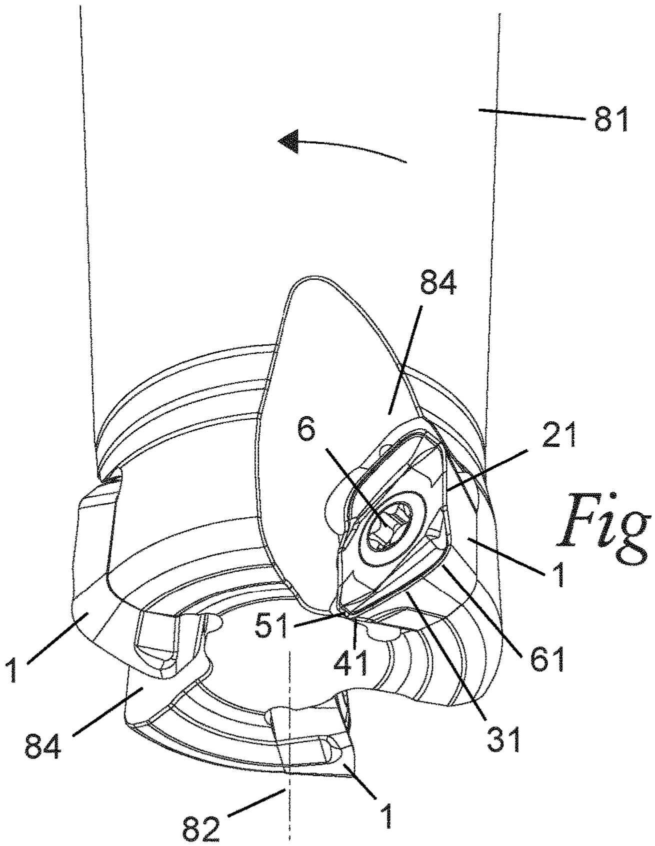
FIG. 5 is a perspective view of a front end of the milling tool of FIG. 3.
Figure 6:
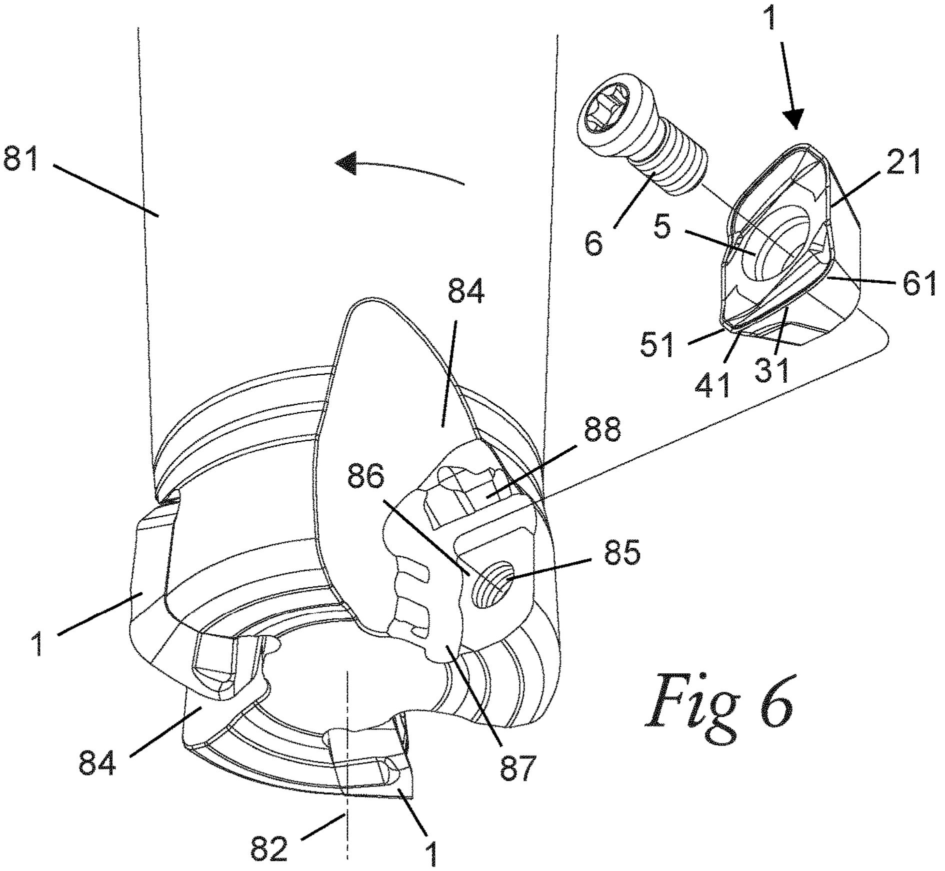
FIG. 6 is a perspective view corresponding to FIG. 5, as seen with a cutting insert removed from its insert seat in the tool body of the milling tool.

Furthermore, the first main cutting edge 31 and the first curved corner cutting edge 61 are preferably so configured that the first curved corner cutting edge 61 is located between the median plane MP and every tangent that can be drawn to the points along the first main cutting edge 31 when seen in a viewing direction in parallel with the median plane MP and perpendicular to a straight line of intersection L1 that intersects the first and second ends 31_a_, 31_b_ of the first main cutting edge 31, i.e. when seen in the lateral view according to FIGS. 1*i* and 2*i*, wherein the second main cutting edge 32 and the third curved corner cutting edge 63 are so configured that the third curved corner cutting edge 63 is located between the median plane MP and every tangent that can be drawn to the points along the second main cutting edge 32 when seen in a viewing direction in parallel with the median plane MP and perpendicular to a straight line of intersection L2 that intersects the first and second ends 32*a*, 32*b* of the second main cutting edge 32, i.e. when seen in the lateral view according to FIGS. 1*j* and 2*j*.

A first chip breaker 71 associated to the first main cutting edge 31 is with advantage formed on the first major face 2 and configured to extend on the first major face 2 along at least a part of the first main cutting edge 31, wherein a second chip breaker 72 associated to the second main cutting edge 32 is formed on the first major face 2 and configured to extend on the first major face 2 along at least a part of the second main cutting edge 32. The first and second chip breakers 71, 72 are preferably configured to extend all along the first and second main cutting edges 31, 32. In the illustrated embodiments, the first chip breaker 71 extends all along the first main cutting edge 31 and also along the first curved corner cutting edge 61, wherein the second chip breaker 72 extends all along the second main cutting edge 32 and also along the third curved corner cutting edge 63. Thus, the first chip breaker 71 and the second chip breaker 72 are in this case also associated to the first curved corner cutting edge 61 and the third first curved corner cutting edge 63, respectively. The first chip breaker 71 has a first end 71*a* facing towards the first ramping cutting edge 51 and an opposite second end 71*b* facing towards the first main side surface 11, wherein the second chip breaker 72 has a first end 72*a* facing towards the second ramping cutting edge 52 and an opposite second end 72*b* facing towards the third main side surface 13. In the illustrated embodiments, the second end 71*b* of the first chip breaker 71 adjoins to the second end 61*b* of the first curved corner cutting edge 61 and also to a part of the first side cutting edge 21 adjacent to the second end 61*b* of the first curved corner cutting edge 61, whereas the second end 72*b* of the second chip breaker 72 adjoins to the second end 63*b* of the third curved corner cutting edge 63 and also to a part of the second side cutting edge 22 adjacent to the second end 63*b* of the third curved corner cutting edge 63.

In the embodiment illustrated in FIGS. 1*a*-1*j*, the first end 71*a* of the first chip breaker 71 adjoins to a third chip breaker 76 that is associated to the first secondary cutting edge 41 and to the first ramping cutting edge 51, whereas the first end 72*a* of the second chip breaker 72 adjoins to a fourth chip breaker 77 that is associated to the second secondary cutting edge 42 and to the second ramping cutting edge 52. The first and third chip breakers 71, 76 together form a continuous chip breaker that extends all the way between the first ramping cutting edge 51 and a part of the first side cutting edge 21. The second and fourth chip breakers 72, 77 together form a continuous chip breaker that extends all the way between the second ramping cutting edge 52 and a part of the second side cutting edge 22.

The first chip breaker 71 has preferably an essentially U-shaped or V-shaped profile as seen in a section across the first chip breaker in parallel with the longitudinal plane LP, to thereby form an elongated first valley 73 on the first major face 2 that extends between the first and second ends 71*a*, 71*b* of the first chip breaker. In this case, also the second chip breaker 72 has an essentially U-shaped or V-shaped profile as seen in a section across the second chip breaker 72 in parallel with said longitudinal plane LP, to thereby form an elongated second valley 74 on the first major face 2 that extends between the first and second ends 72*a*, 72*b* of the second chip breaker. Each one of the first and second valleys 73, 74 has preferably a depth that increases as seen in a direction along the chip breaker from the first end 71*a*, 72*a* thereof to the second end 71*b*, 72*b* thereof. In the illustrated embodiments, each one of the first and second valleys 73, 74 has a width w that increases as seen in a direction along the chip breaker from the first end 71*a*, 72*a* thereof to the second end 71*b*, 72*b* thereof, wherein the width w of a valley 73, 74 is measured as the distance, in a plane that extends in parallel with the longitudinal plane LP, between a first longitudinal edge of the valley on a first side of the valley and a second longitudinal edge of the valley on an opposite second side of the valley.

Each one of the first and second main cutting edges 31, 32 and each one of the first and second secondary cutting edges 41, 42 has preferably a nominal rake angle that is positive or neutral. In the illustrated embodiments, the nominal rake angles of the main cutting edges 31, 32 and the secondary cutting edges 41, 42 are positive. Also the nominal rake angle of the first and second ramping cutting edges 51, 52 is positive in the illustrated embodiments.

A reinforcement land 9 in the form of a chamfer with a small width may in a conventional manner be arranged on the first major face 2 between one or more of the cutting edges 21, 22, 31, 32, 41, 42, 51, 52, 61-63 and the associated rake faces. The reinforcement land 9 may have a nominal rake angle that is negative, neutral or positive.

The cutting insert 1 illustrated in FIGS. 1*a*-1*j* is a single-sided and two-way indexable cutting insert with cutting edges arranged only along the periphery of the first major face 2, which implies that the cutting insert 1 can be mounted in two different index positions in the milling tool by rotating the cutting insert by 180° about the centre axis C. In this case, the second major face 3, i.e. the bottom surface of the cutting insert, is preferably flat and configured to extend perpendicularly to the centre axis C. However, a single-sided and two-way indexable cutting insert 1 of this type could also have a profiled bottom surface.

The cutting insert 1 illustrated in FIGS. 2*a*-2*j* is a double-sided and four-way indexable cutting insert with cutting edges arranged along the periphery of the first major face 2 and also along the periphery of the second major face 3, which implies that the cutting insert 1 can be mounted in four different index positions in the milling tool. In this case, the first and second major faces 2, 3 are identical to each other, within manufacturing tolerances, and the cutting edges arranged along the periphery of the second major face 3 are, within manufacturing tolerances, identical to the above-described cutting edges 21, 22, 31, 32, 41, 42, 51, 52, 61-64 arranged along the periphery of the first major face 2.

FIGS. 3-6 illustrate a milling tool 80 in the form of an end mill tool suitable for use in ramping and pocketing operations. The milling tool 80 comprises an elongated tool body 81 and is configured to be rotated about an axis of rotation 82. The tool body 81 has a rear end 81*a* and an opposite front end 81*b*. A longitudinal axis 83 of the tool body 81 extends between the rear end 81*a* and the front end 81*b* of the tool body, wherein this longitudinal axis 83 coincides with the axis of rotation 82 of the milling tool 80. At the rear end 81*a*, the tool body 81 is to be mounted to a rotating spindle or the similar of a milling machine, for instance via a tool holder. At the front end 81*b*, the tool body 81 is provided with insert seats 84 configured to receive cutting inserts 1. In the illustrated example, the tool body 81 is provided with three insert seats 84, which are evenly distributed about the longitudinal axis 83 of the tool body and which are configured to receive cutting inserts 1. However, the tool body 81 may as an alternative, inter alia depending on the diameter of the tool body, be provided with any other suitable number of insert seats 84. A smaller diameter tool body may for instance be provided with two insert seats, whereas a larger diameter tool body may be provided with more than three insert seats.

A cutting insert 1 is mounted in each one of the insert seats 84 in the tool body 81. In the embodiment illustrated in FIGS. 3-6, the milling tool 80 is provided with cutting inserts 1 of the type illustrated in FIGS. 1*a*-1*j*. Each cutting insert 1 is configured to be releasably mounted to the associated insert seat 84. In the illustrated embodiment, each cutting insert 1 is fixed to the associated insert seat 84 by means of a fastening element 6 in the form of a screw, which extends through the through hole 5 in the cutting insert 1 and is engaged in a threaded hole 85 (see FIG. 6) in a tangential support surface 86 in the insert seat. The insert seat 84 is also provided with a radial support surface 87 and an axial support surface 88. The cutting insert 1 is provided with a radial abutment face 7 on each one of the first and third main side surfaces 11, 13 and an axial abutment face 8 on each one of the second and fourth main side surfaces 12, 14. The radial and axial abutment faces 7, 8 on the first and second main side surfaces 11, 12 form a first pair of abutment faces and the radial and axial abutment faces 7, 8 on the third and fourth main side surfaces 13, 14 form a second pair of abutment faces. The radial and axial abutment faces 7, 8 of each pair are preferably positioned at an acute angle in relation to each other, as seen in a cross-sectional plane of the cutting insert 1 in parallel with the median plane MP, wherein the radial and axial support surfaces 87, 88 of each insert seat 84 are positioned at a corresponding acute angle in relation to each other.

When mounted in an insert seat 84, the cutting insert 1 is so arranged that the second major face 3, or at least a portion thereof, abuts against the tangential support surface 86 in the insert seat and the radial and axial abutment faces 7, 8 of one of said pairs abut against the radial support surface 87 and the axial support surface 88, respectively, in the insert seat. When the cutting insert 1 is so positioned that the radial and axial abutment faces 7, 8 of said second pair are abutting against the radial and axial support surfaces 87, 88, the first side cutting edge 21, the first curved corner cutting edge 61, the first main cutting edge 31, the first secondary cutting edge 41 and the first ramping cutting edge 51 are in an active position and constitute the active cutting edges. When the cutting insert 1 is so positioned that the radial and axial abutment faces 7, 8 of said first pair are abutting against the radial and axial support surfaces 87, 88, the second side cutting edge 22, the third curved corner cutting edge 63, the second main cutting edge 32, the second secondary cutting edge 42 and the second ramping cutting edge 52 are in an active position and constitute the active cutting edges.

In a ramping operation, the active main cutting edge 31, 32, the active ramping cutting edge 51, 52 and possibly also the active curved corner cutting edge 61, 63 perform major cuts into the workpiece, while the surface-wiping cutting edge section 43 on the active secondary cutting edge 41, 42 only performs a shallow surface smoothing cut.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A cutting insert for use in high-feed milling, the cutting insert comprising:

first and second major faces arranged on opposite sides of the cutting insert and serving as top and bottom faces of the cutting insert;

a center axis extending between the first and second major faces, wherein the cutting insert has 180° rotational symmetry about the center axis;

a median plane extending halfway between the first and second major faces, perpendicularly to the center axis;

a peripheral relief surface extending around the cutting insert between the first and second major faces and including a first main side surface, a second main side surface, a third main side surface, a fourth main side surface, a first corner side surface, a second corner side surface, a third corner side surface and a fourth corner side surface, wherein:

the first corner side surface is located between the first and second main side surfaces, the second corner side surface is located between the second and third main side surfaces, the third corner side surface is located between the third and fourth main side surfaces, the fourth corner side surface is located between the first and fourth main side surfaces, the first and third main side surfaces form a first pair of opposing main side surfaces, and the second and fourth main side surfaces form a second pair of opposing main side surfaces;

a first side cutting edge formed at an intersection between the first main side surface and the first major face;

a second side cutting edge formed at an intersection between the third main side surface and the first major face;

a first main cutting edge, a first secondary cutting edge and a first ramping cutting edge formed at an intersection between the second main side surface and the first major face, wherein the first secondary cutting edge is located between the first main cutting edge and the first ramping cutting edge;

a second main cutting edge, a second secondary cutting edge and a second ramping cutting edge formed at an intersection between the fourth main side surface and the first major face, wherein the second secondary cutting edge is located between the second main cutting edge and the second ramping cutting edge;

a first curved corner cutting edge formed at an intersection between the first corner side surface and the first major face, wherein the first curved corner cutting edge is located between the first side cutting edge and the first main cutting edge;

a second curved corner cutting edge formed at an intersection between the second corner side surface and the first major face, wherein the second curved corner cutting edge is located between the first ramping cutting edge and the second side cutting edge;

a third curved corner cutting edge formed at an intersection between the third corner side surface and the first major face, wherein the third curved corner cutting edge is located between the second side cutting edge and the second main cutting edge; and a fourth curved corner cutting edge formed at an intersection between the fourth corner side surface and the first major face, wherein the fourth curved corner cutting edge is located between the second ramping cutting edge and the first side cutting edge, wherein a shortest distance between the opposing first and second main cutting edges is equal to or larger than a shortest distance between the opposing first and second side cutting edges, wherein the first main cutting edge has a first end connected to the first secondary cutting edge and a second end connected to the first curved corner cutting edge, and the second main cutting edge has a first end connected to the second secondary cutting edge and a second end connected to the third curved corner cutting edge, each one of the first and second main cutting edges having one or more sloping parts between the first and second ends with such slope or slopes that the second end is located closer to the median plane than the first end, wherein the first ramping cutting edge has a first end connected to the first secondary cutting edge and a second end connected to the second curved corner cutting edge, and the second ramping cutting edge has a first end connected to the second secondary cutting edge and a second end connected to the fourth curved corner cutting edge, each one of the first and second ramping cutting edges having one or more sloping parts between the first and second ends with such slope or slopes that the second end is located closer to the median plane than the first end, and wherein the first main cutting edge and the first ramping cutting edge extend at an obtuse angle in relation to each other as seen in a plan view of the cutting insert as seen along the center axis toward the first major face, the second main cutting edge and the second ramping cutting edge extending at a corresponding obtuse angle in relation to each other as seen in the plan view of the cutting insert, wherein the second end of each one of the first and second main cutting edges is located closer to the median plane than the second end of each one of the first and second ramping cutting edges.

2. The cutting insert according to claim 1, wherein the obtuse angle is 95°-160°.

3. The cutting insert according to claim 1, wherein each one of the first and second main cutting edges slopes towards the median plane along more than 50% of the length of the main cutting edge when going from its the first end to the second end of the main cutting edge, or along the entire length from the first end to the second end of said main cutting edge.

4. The cutting insert according to claim 3, wherein each one of the first and second main cutting edges slopes towards the median plane with the slope that is constant or increases as seen along its the entire length of said main cutting edge from its the first end to the second end of said main cutting edge.

5. The cutting insert according to claim 1, wherein in a first view taken along a direction that is parallel to the median plane and perpendicular to a straight first line that passes through the first and second ends of said first main cutting edge, the first main cutting edge appears as a straight line, or a convex line, or a line which is a series of one or more straight lines in combination with one or more convex lines, wherein in a second view taken along a direction that is parallel to the median plane and perpendicular to a straight second line that passes through the first and second ends of said second main cutting edge, appears as a corresponding line.

6. The cutting insert according to claim 1, wherein each one of the first and second ramping cutting edges slopes towards the median plane along its entire length from its first end to its second end.

7. The cutting insert according to claim 1, wherein the first curved corner cutting edge has a first end connected to the first main cutting edge and a second end connected to the first side cutting edge and the third curved corner cutting edge has a first end connected to the second main cutting edge and a second end connected to the second side cutting edge and each one of the first and third curved corner cutting edges has one or more sloping parts between its first and second ends with such slope or slopes that its second end is located closer to the median plane than its first end.

8. The cutting insert according to claim 7, wherein each one of the first and third curved corner cutting edges slopes towards the median plane along its entire length from its first end to its second end.

9. The cutting insert according to claim 8, wherein each of the first and third curved corner cutting edges slopes towards the median plane, the slope of each of the first and third curved corner cutting edges towards the median plane being either constant along the entire length from the first end to the second end of the respective curved corner cutting edge or increasing along the entire length from the first end to the second end of the respective curved corner cutting edge.

10. The cutting insert according to claim 1, wherein in every point along the first curved corner cutting edge a distance between the first curved corner cutting edge and the median plane is equal to or smaller than a distance between the second end of the first main cutting edge and the median plane, wherein in every point along the third curved corner cutting edge a distance between the third curved corner cutting edge and the median plane is equal to or smaller than a distance between the second end of the second main cutting edge and the median plane.

11. The cutting insert according to claim 1, wherein the first main cutting edge and the first curved corner cutting edge are so configured such that, in a first view taken along a direction that is parallel to the median plane and perpendicular to a straight line that passes through the first and second ends of the first main cutting edge, the first curved corner cutting edge is positioned between the median plane and a tangent drawn at any point along the first main cutting edge in said first view, and wherein the second main cutting edge and the third curved corner cutting edge are configured such that, in a second view taken along a direction that is parallel to the median plane and perpendicular to a straight line that passes through the first and second ends of the second main cutting edge, the third curved corner cutting edge is positioned between the median plane and a tangent drawn at any point along the second main cutting edge in said second view, wherein the second main cutting edge and the third curved corner cutting edge are so configured such that, in a second viewing direction parallel to the median plane and perpendicular to a straight line that passes through the first and second ends of the second main cutting edge, the third curved corner cutting edge is positioned between the median plane and a tangent drawn at any point along the second main cutting edge in said second viewing direction.

12. The cutting insert according to claim 1, wherein a first chip breaker is formed on the first major face and extends along at least a portion of the first main cutting edge or along its entire length, wherein the first chip breaker has a first end facing towards the first ramping cutting edge and an opposite second end facing towards the first main side surface, and wherein the first chip breaker further extends along the first curved corner cutting edge, and a second chip breaker is formed on the first major face and extends along at least a portion of the second main cutting edge, or along its entire length, wherein the second chip breaker has a first end facing towards the second ramping cutting edge and an opposite second end facing towards the third main side surface, and wherein the second chip breaker further extends along the third curved corner cutting edge.

13. The cutting insert according to claim 12, wherein the first curved corner cutting edge has a first end connected to the first main cutting edge and a second end connected to the first side cutting edge and the third curved corner cutting edge has a first end connected to the second main cutting edge and a second end connected to the second side cutting edge, and the second end of the first chip breaker adjoins the second end of the first curved corner cutting edge, and the second end of the second chip breaker adjoins the second end of the third curved corner cutting edge.

14. The cutting insert according to claim 12, wherein the first chip breaker has a U-shaped or V-shaped first profile in sectional view across the first chip breaker, the sectional view being taken along a plane parallel to a longitudinal plane of the cutting insert that extends halfway between the first and third main side surfaces, perpendicular to the median plane, and containing the center axis, the first profile forming an elongated first valley on the first major face that extends between the first and second ends of the first chip breaker, and the second chip breaker has a U-shaped or V-shaped second profile in sectional view across the second chip breaker in, said sectional view being taken along a plane parallel to said longitudinal plane, the second profile forming an elongated second valley on the first major face that extends between the first and second ends of the second chip breaker.

15. The cutting insert according to claim 14, wherein the first valley has a depth that increases as seen in a direction along the first chip breaker from the first end thereof to the second end thereof, wherein the second valley has a depth that increases as seen in a direction along the second chip breaker from the first end thereof to the second end thereof.

16. The cutting insert according to claim 14, wherein the first valley has a width that increases as seen in a direction along the first chip breaker from the first end thereof to the second end thereof, and wherein the second valley has a width that increases as seen in a direction along the second chip breaker from the first end thereof to the second end thereof.

17. The cutting insert according to claim 1, wherein each of the first and second main cutting edges and each one of the first and second secondary cutting edges has a rake angle that is positive or neutral.

18. The cutting insert according to claim 1, wherein the cutting insert is a single-sided and two-way indexable cutting insert, and wherein the second major face is flat and extends perpendicularly to the center axis.

19. A high feed milling tool comprising at least one cutting insert according claim 1.

20. The cutting insert according to claim 9, wherein, at each point along the first curved corner cutting edge, the first curved corner cutting edge has an inclination towards the median plane that is equal to or greater than a minimum inclination towards the median plane of the first main cutting edge occurring at any point along the first main cutting edge, and wherein, at each point along the third curved corner cutting edge, the third curved corner cutting edge has an inclination towards the median plane that is equal to or greater than a minimum inclination towards the median plane of the second main cutting edge occurring at any point along the second main cutting edge.

* * * * *